United States Patent
Rodriguez

(10) Patent No.: US 6,618,981 B1
(45) Date of Patent: Sep. 16, 2003

(54) ERGONOMIC CHEST MOUNTED TACKLE BOX

(76) Inventor: Enrique N Rodriguez, 10615 Rosewood Ave., Everett, WA (US) 98204

( * ) Notice: Subject to any disclaimer, the term of this patent is extended or adjusted under 35 U.S.C. 154(b) by 0 days.

(21) Appl. No.: 10/199,816

(22) Filed: Jul. 18, 2002

(51) Int. Cl.[7] .............................................. A01K 97/04
(52) U.S. Cl. ...................................... 43/54.1; 224/623
(58) Field of Search ................................ 43/54.1, 21.2; 224/920, 623, 629, 638, 646; 206/816, 315.11; 220/345.1, 350; D22/134; D3/221, 260, 904, 905

(56) References Cited

U.S. PATENT DOCUMENTS

| | | | | |
|---|---|---|---|---|
| 1,549,400 A | * | 8/1925 | Wimler | 220/23.2 |
| 2,853,709 A | * | 9/1958 | Peterson et al. | 2/51 |
| 3,113,817 A | * | 12/1963 | Imel | 206/315.11 |
| 3,148,811 A | * | 9/1964 | Foltz | 224/199 |
| 3,151,790 A | * | 10/1964 | Mavrakis | 224/199 |
| 3,159,441 A | * | 12/1964 | Sikma | 220/815 |
| 3,277,599 A | * | 10/1966 | Griffeth | 224/199 |
| 3,582,171 A | * | 6/1971 | McArdle et al. | 206/816 |
| 3,638,843 A | * | 2/1972 | Ortynski | 206/315.11 |
| 4,162,024 A | * | 7/1979 | Shanley | 206/816 |
| D284,422 S | * | 7/1986 | Pomaville | D22/199 |
| 4,890,414 A | * | 1/1990 | Bridenthal et al. | 220/259.2 |
| 4,892,241 A | * | 1/1990 | Mavrakis | 206/315.11 |
| 6,382,490 B1 | * | 5/2002 | Divincenzo | 206/315.11 |
| 6,427,377 B1 | * | 8/2002 | Kim | 43/4 |
| 6,435,390 B1 | * | 8/2002 | Abramowicz | 224/629 |
| 2002/0070220 A1 | * | 6/2002 | Kuehn et al. | 220/350 |

* cited by examiner

*Primary Examiner*—Peter M. Poon
*Assistant Examiner*—Susan Piascik
(74) *Attorney, Agent, or Firm*—Todd N. Hathaway

(57) ABSTRACT

A chest-worn tackle box assembly. The assembly includes a breast plate that is supported by a shoulder harness, and a storage box which is mounted to the breast plate so as to be pivotable from a vertical stowed position in which the top of the box lies against the breast plate, to a horizontal position in which the access opening of the box is disposed upwardly. The assess opening is covered by a tambour door having edges retained in tracks in the sidewalls of the storage box. The tambour door is slid open to access an internal compartment of the storage box, a vertical space being provided between the lower wall of the storage box and the floor of the internal compartment to receive the door as it slides into the lower runs of the tracks. The internal compartment may be subdivided for segregated storage of tackle items.

27 Claims, 4 Drawing Sheets

ERGONOMIC CHEST MOUNTED TACKLE BOX

BACKGROUND OF THE INVENTION a. Field of the Invention

The present invention relates generally to tackle boxes, and, more particularly, to an ergonomic chest-worn box for the organization and storage of fishing tackle or other items.

b. Background Art

Because of the gear intensive nature of fishing, it is common for fishermen to employ a tackle box for the storage and organization of their various paraphernalia such as lures, flies, weights, leaders, and other tackle. Typically, these tackle boxes are large, cumbersome affairs containing a myriad of complex trays, drawers, slots, and fold out compartments intended to systematically arrange the gear for quick, easy access. However, because of the size and complexity of these tackle boxes, they are usually deposited in one spot near the fishing source, e.g., on the shore, and the user must constantly return to the box to change lures, reconfigure the leader, or alter rigging to adapt to changes in fishing conditions. For serious fishermen, this is a major inconvenience which detracts from the gear in remote locations. While these devices may have addressed the portability issue, their functionality remains deficient in several areas.

First, the portable tackle boxes found in the prior art typically comprise a rectangular box shaped enclosure which is ergonomically deficient for an article that is intended to be worn by a person. Whether slung over the shoulder or mounted on the chest, the sharp corners and abrupt edges inevitably bear against the user's body and cause discomfort. This discomfort is accentuated as the wearer articulates his body, such as when casting or stooping down to release a fish.

The instability of many of these units further aggravates the discomfort issue. For instance, the shoulder borne variety of portable tackle boxes are inherently unstable. They tend to swing on the shoulder of the wearer, banging against the body or sliding off the shoulder with every false step or sudden movement. Considering the mobility and agility required for negotiating a stream crossing or bushwhacking a wooded bank, the shoulder worn tackle boxes are simply inappropriate.

While the chest worn tackle boxes provide better securement, many of them protrude excessively from the chest, causing instability and magnifying their discomfort. Because of the protrusive designs, the centers of gravity on these boxes are excessively outboard of the wearer's body. This makes them prone to lateral swinging, and the cantilever effect causes the body supported edges to dig in to the wearer's chest. With any sort of abrupt or bouncy movement, this detrimental effect is augmented. In addition, many of these boxes have flip out compartments which, when opened, extends the center of gravity even farther from the chest, thus further reducing the comfort level.

Another deficiency common among many of the portable chest borne tackle boxes is the cluttered, complex arrangement of lids, flaps and drawers which must be negotiated in order to access the stored items. Many of these units share the complex construction typical of their larger, non-portable brethren, yet, for many situations, these "bells and whistles" are undesirable on a portable unit. For instance, when balanced in a rocking boat or thigh deep in a frigid stream, access to the gear should be quick and simple. The dexterity and patience required to access many of the portable units found in the prior art is excessive in these types of situations. In addition, the complex arrangement of flip top access lids and fold out trays, common on many of these units, presents numerous opportunities for line entanglement. Aside from the functionality issues, the complexity of many portable tackle boxes drives up the cost and increases the weight, both of which should be minimized to enhance commercial success.

Accordingly, there exists a need for a portable chest mounted tackle box that is ergonomically designed such that, even during dynamic activities, it remains stably supported and comfortable to wear. Furthermore, there exists a need for such a device that is sleek and uncluttered, allowing quick and easy access to its contents and reducing the risk of line entanglement. Still further, there exists a need for such a device which maintains design simplicity, allowing reduced weight for enhanced portability, and part consolidation for low cost production.

SUMMARY OF THE INVENTION

The present invention has solved the problems cited above, and is an ergonomic chest mounted tackle box for the organization, storage and deployment of fishing tackle or other items. Broadly, the invention comprises, (a) a breast panel member, anatomically contoured to the general shape of a person's chest region, providing comfortable, stabilizing support means for substantially vertical stowage or substantially horizontal deployment of a housing element by means of a pivotal connection, (b) a housing element, pivotally supported from the breast panel member and providing a containment for a compartmentalized receptacle member, (c) a receptacle member providing storage for tackle or other items and comprising a partitioning element for dividing the receptacle member into one or more storage bins, (d) a lid element comprising a tamboured closure for containment of items stored in the receptacle member, (e) a latch member for securing the housing element in a substantially vertically disposed position against the breast panel member when stowed, (f) a harness system providing securement of the tackle box assembly to the users upper torso by means of shoulder strap elements affixed to the breast panel member.

The breast panel member of the present invention serves as a stabilizing and load bearing element which comfortably supports and distributes the load of the tackle box assembly and stored contents on the wearer's chest. Accordingly, the breast panel may comprise a substantially rectangular and vertically disposed semi-rigid sheet of material, sized and contoured to anatomically conform to the general shape of a person's chest region. The corners of the sheet may be "softened" by rounding them, and the width and vertical length of the breast panel may be generously specified to assure lateral stability and adequate surface area for load bearing comfort. By using a semi-rigid sheet material, the breast panel may yielding deflect and conform as the wearer articulates his body. Unlike other portable tackle boxes found in the prior art, in which rigid box-like structures with corners and edges bear against the body, the chest panel of the present invention provides a conformal, semi-compliant protective barrier which serves as an intermediate load bearing surface between the user's body and tackle box load. Load is transferred into the breast panel through a pivotal connection with the tackle box housing and receptacle assembly. Towards the lower end of the breast panel, two parallel, vertically oriented hinge tabs may extend forward proximate either side edge. Each hinge tab may include a circular aperture, thus providing means for pinned pivotal connection of the housing and receptacle assembly.

The breast panel may be secured to the wearer's chest by means of a harness system that may comprise left and right shoulder straps. The left shoulder strap may connect to the breast panel proximate its upper left corner, pass over the wearer's left shoulder, pass under the left arm and reconnect to the breast panel proximate its lower left corner. The right shoulder strap may connect to the breast panel proximate its upper right corner, pass over the wearer's right shoulder, pass under the right arm and reconnect to the breast panel proximate its lower right corner. To assure that the shoulder straps remain seated on the wearer's shoulders during dynamic activities, a substantially horizontally disposed lateral stabilizing strap may connect between the two shoulder straps across the wearer's upper back.

The housing element mounts to the breast panel via the panel's hinge tabs and serves as a pivoting enclosure for the receptacle member and the tackle stored within. The housing element is essentially a four sided, open topped box, which may comprise a substantially flat and rectangular floor that contours seamlessly into an accurate front wall and a substantially vertically disposed, flat rear wall. The side walls may comprise flat, vertically disposed plates with front, rear, and bottom edge profiles that conform to the respective front wall, rear wall, and floor of the housing. The top edge of each side wall may be contoured to conform with the breast panel profile, such that when the housing is pivoted upward into a stowed position, the unit nests snugly against the breast panel, thus drawing the housing's center of gravity closer to the wearer's body and minimizing instability.

On the inside face of each side wall, a continuous parallel set of raised ribs may run adjacent each wall's top, front, and bottom edges, forming a track for the sliding retention of a tamboured lid. To enclose the top of the housing, the tamboured lid is slid towards the rear housing wall, and to access the housing contents, the tamboured lid is slid towards the front wall. The arcuate shape of the front wall and the corresponding arced profile of the track along the conforming front edge of the side walls, allows the tamboured lid to slidingly transition from the top of the housing to the floor of the housing while being opened. By using a tamboured lid, no flip top access lids are required, thus simplifying access to the housing contents and reducing the risk of line entanglement.

It would be impractical to place tackle directly within the housing since these items would interfere with the sliding operation of the tamboured lid as it traverses the housing floor while being opened. Thus, a receptacle member, providing storage means for tackle or other items, may be secured within the housing in a position elevated above the housing floor. By elevating the receptacle, an internal cavity is formed, between the receptacle floor and the housing floor, which accommodates the sliding insertion of the tamboured lid when opened.

The receptacle may comprise a rectangular, four sided, open topped box with a floor, two side walls, a front wall and a rear wall. The receptacle may be divided into one or more storage bins by positioning a partitioning element within the receptacle's interior. The partitioning element may comprise a unitized, interlocking network of dividers in the conventional manner, or may comprise a modular arrangement of individual dividers or boxes that may be configured according to user preference. In addition, the partitioning element may be fixed within the receptacle or removable in part or in total. The height of the receptacle walls and partitioning element may be configured such that when closed, the tamboured lid securely seals the contents and prevents spillover between bins regardless of the housing's orientation.

The rear of the housing/receptacle assembly nests between the two hinge tabs on the breast panels; and circular apertures, configured to align with the hinge tab apertures, may be formed in the side walls of the housing/receptacle assembly. Through these aligned apertures, a fastener may join each hinge tab to the corresponding side wall of the housing/receptacle assembly, thus forming a pivotal connection which allows the housing to rotate about a horizontal axis with respect to the stationary breast panel. In the deployed position, the housing may rotate downward until the housing's rear wall contacts the breast panel. In this position, the housing extends substantially normal to the breast panel in the form of a shelf, thus allowing quick and convenient access to the housing's contents by simply sliding the tamboured lid open. Since the rear wall of the housing bears against the breast panel, the load is comfortably distributed over the wearer's chest rather than digging into the lower portion of the chest cavity as is common among tackle boxes found in the prior art.

When immediate access is not required, the housing/receptacle assembly may be conveniently stowed by sliding the tamboured lid shut and rotating the housing into a vertical position such that profiled top edges of the housing's side walls mate with the matching contour in the breast panel. A latch member may secure the housing to the breast panel in this position, creating a low profile package with enhanced stability.

The invention, together with further aspects and advantages thereof, may be further understood by reference to the following detailed description and accompanying drawings.

DETAILED DESCRIPTION
a. Overview

As used in this description and the appended claims, the terms "forward", "rearward", "upper", "lower", "vertical", "horizontal" and so forth reference the orientation of the assembly of the present invention as this is worn on the front of a person's chest, generally as shown in the figures.

Figure 1:
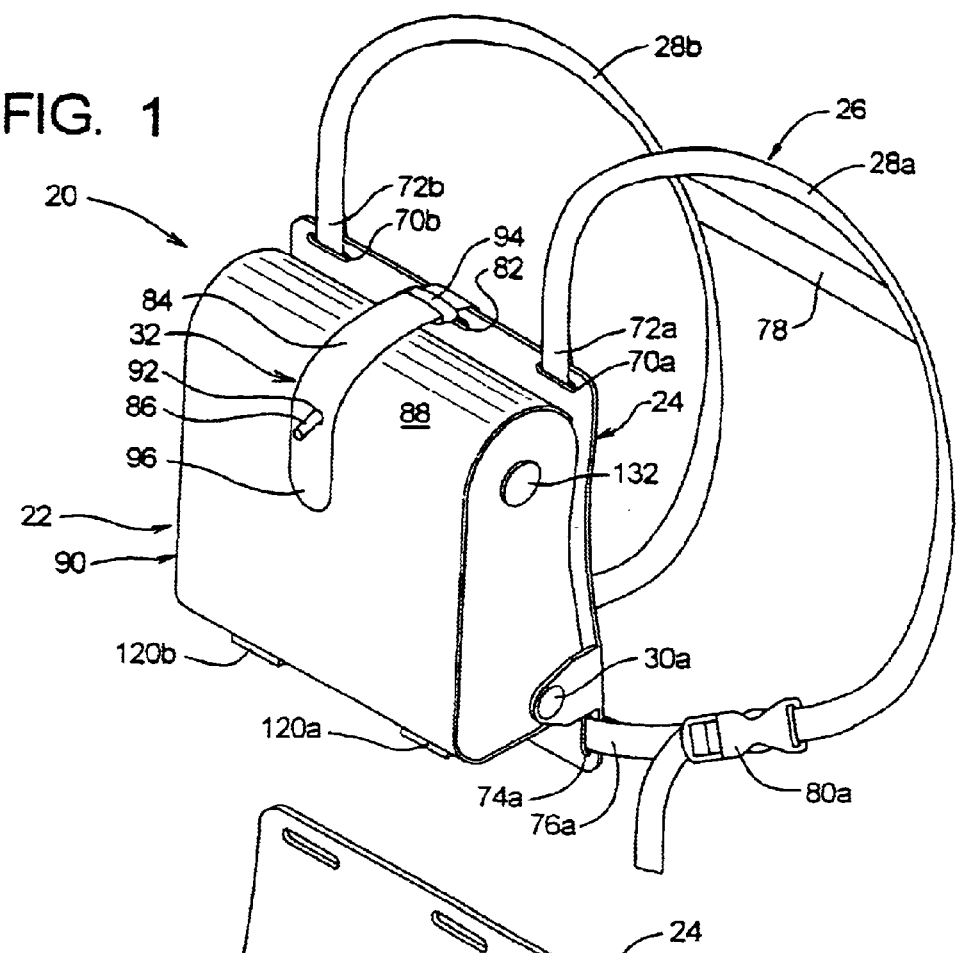
FIG. 1 is an isometric view of a portable tackle box in accordance with the present invention, showing the storage assembly in the stowed position.

FIG. 1 shows an ergonomic chest mounted tackle box 20 in accordance with the present invention. The tackle box 20 comprises three main assemblies including, (a) a storage assembly 22 which provides a secured enclosure for the storage of tackle or other items, (b) a breast panel assembly 24, which mounts to the user's upper torso and supports, distributes, and stabilizes the storage assembly load on the wearer's chest, (c) and a harness assembly 26 which comprises shoulder straps 28a, b for securing the tackle box to the wearer's chest.

FIG. 1 shows the tackle box 20 in the stowed position. The storage assembly 22 had been rotated upward about the axes of the hinge fasteners 30a, b into a substantially vertical position where it conformingly mates with the breast panel assembly 24 and is secured with a latch 32. This stowed position is the desired orientation when immediate access to the contents of the storage assembly 22 is not required. In this configuration, the storage assembly 22 maintains a very stable, low profile against the wearer's chest, reducing the risk of snagging on tree branches or fishing lines, and allowing the user to perform articulated athletic activities with comfort and stability.

Figure 2:
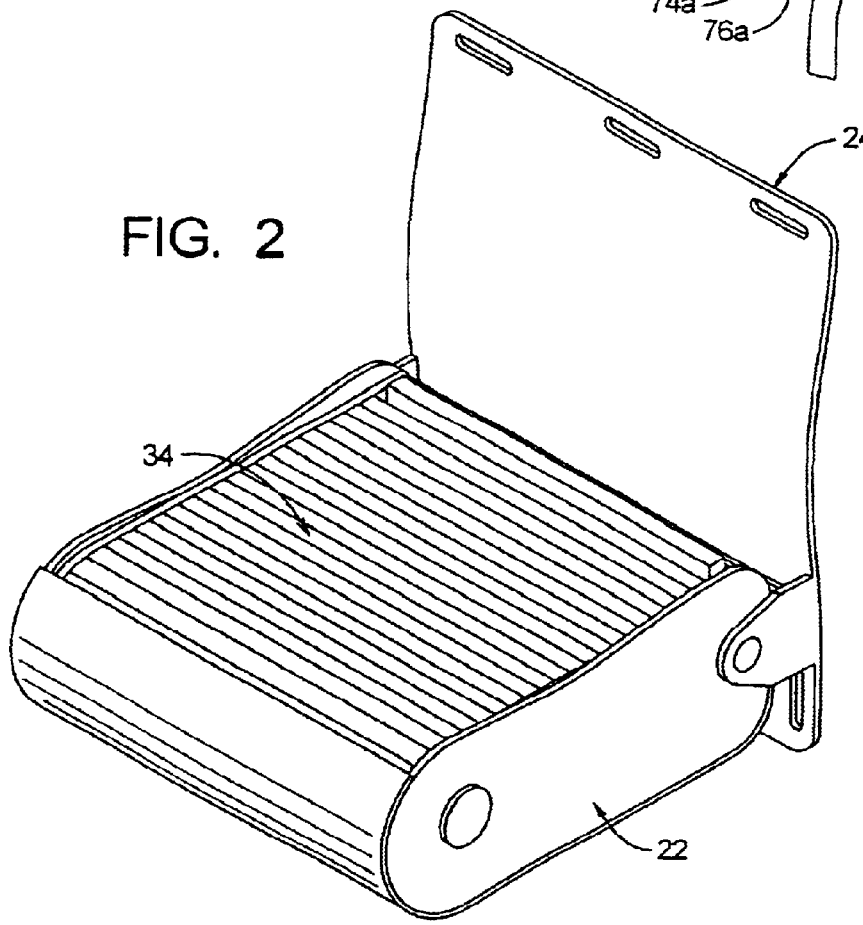
FIG. 2 is an isometric view of the portable tackle box of FIG. 1, showing the storage assembly in the deployed position and with the harness and latch assemblies removed.

When access to tackle or other items is required, the storage assembly 22 may be deployed by releasing the latch 32, and counter-rotating the storage assembly 22 downward until the pivot stops 120a, b on its rear wall contacts the breast panel 24. This deployed position is shown in FIG. 2 in which the harness assembly 26 and latch 32 have been removed for clarity. In this position, the storage assembly 22 extends substantially normal to the breast panel 24 in the form of a shelf, thus allowing quick and convenient access to the storage assembly's contents by simply sliding the tamboured lid 34 open. The cantilevered load of the storage assembly is supported and distributed through the chest panel 24, thus assuring no discomfort.

Figure 3:
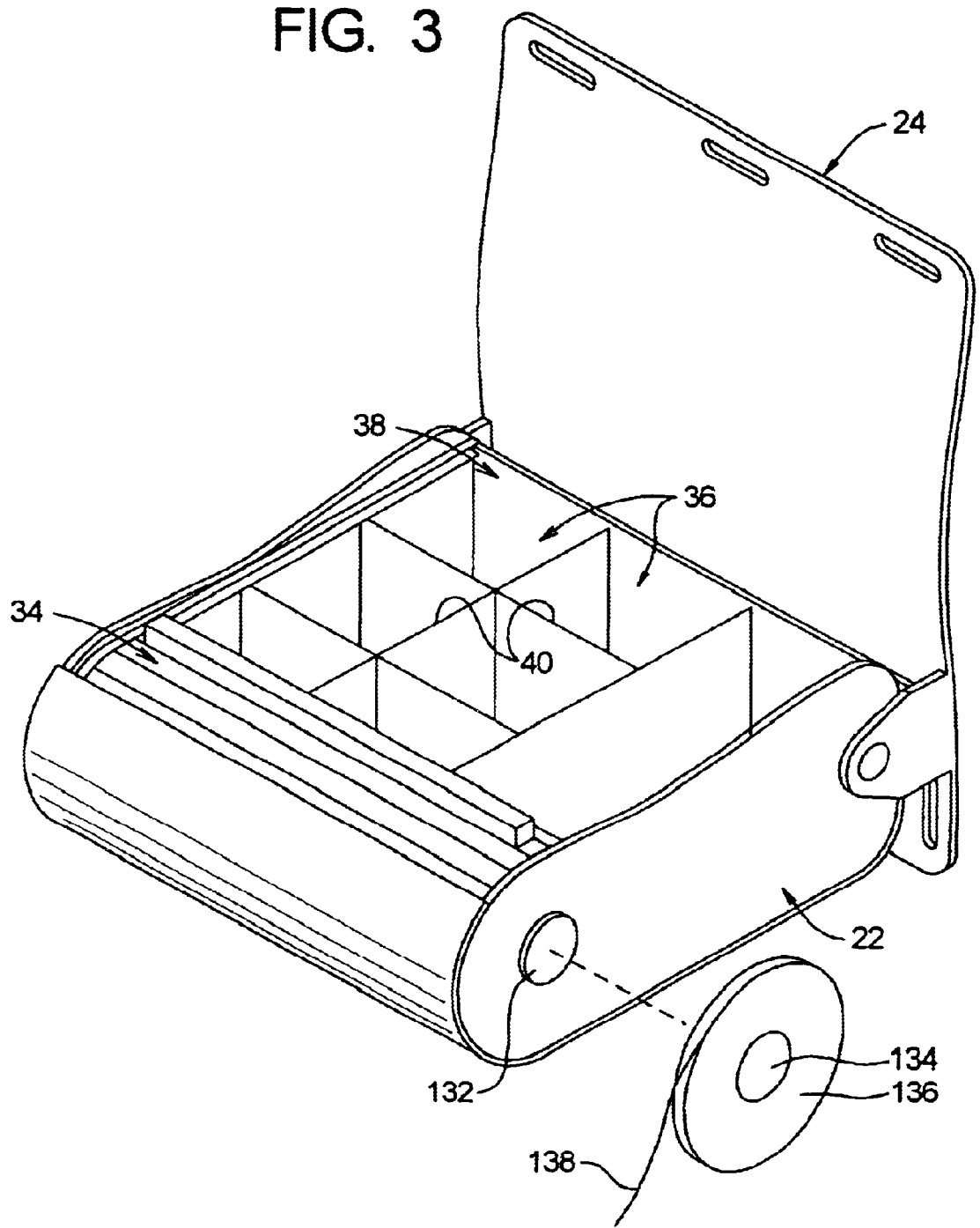
FIG. 3 is an isometric view of the portable tackle box of FIG. 1, showing the storage assembly in the deployed position and with the tamboured lid opened assemblies removed.

In FIG. 3, the tamboured lid 34 has been slid open, exposing the storage bins 36 formed by the receptacle box 38 and partitions 40, and allowing access to the stored contents.

The tackle box of the present invention may be provided in various sizes, as in different sizes for use by adults and children. The breast panel having the configuration described below has been found ergonomically suitable for both male and female users.

b. Breast Panel, Harness, and Latch

Figure 4:
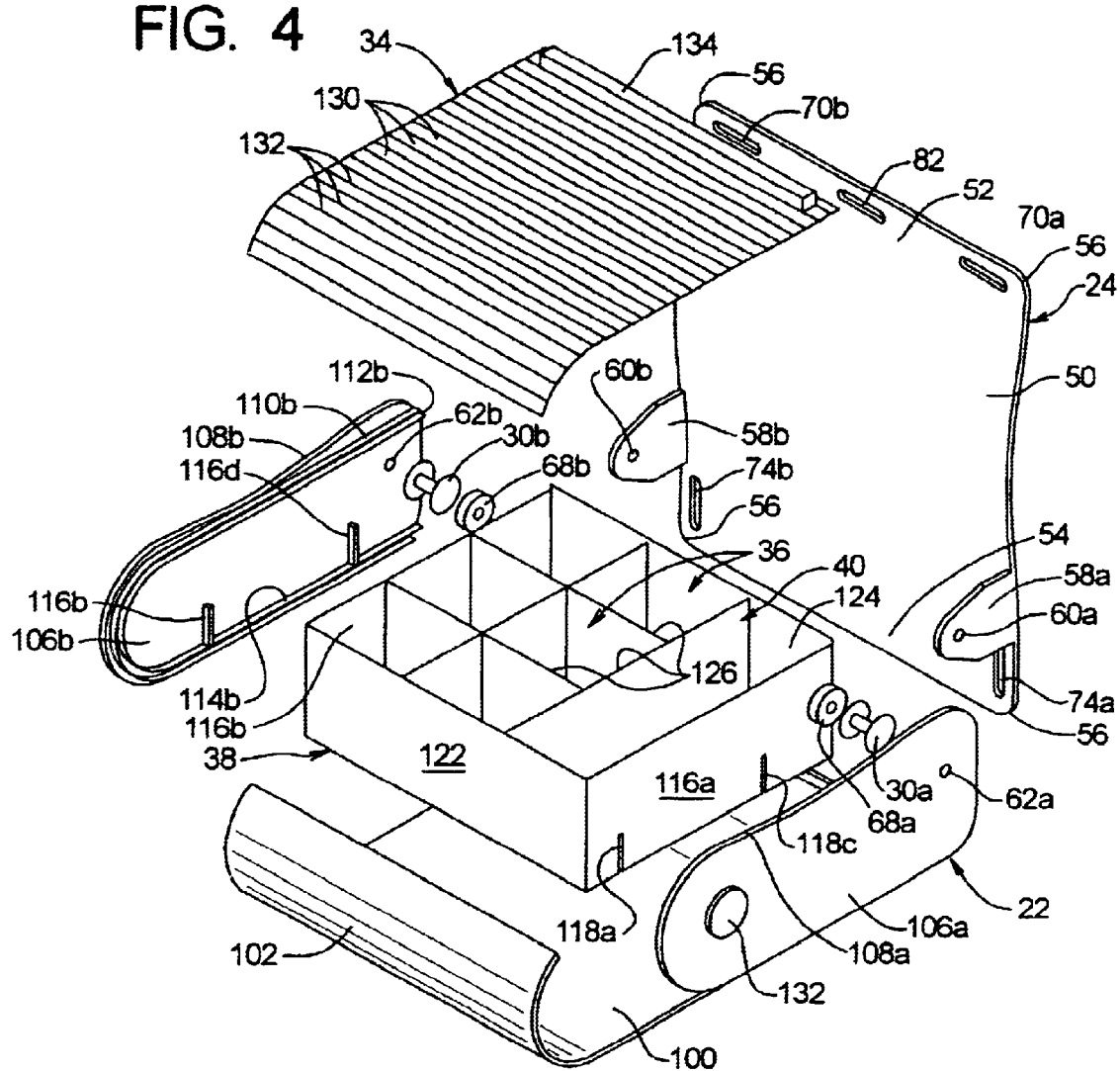
FIG. 4 is an exploded, isometric view of the portable tackle box of FIG. 1, showing the storage assembly in the deployed position and the harness and latch assemblies removed.

The breast panel 24 may best be described by referring to FIG. 4, which is an exploded view of the tackle box invention with the harness assembly 26 and latch 32 removed for clarity. In this preferred embodiment, the breast panel 24 comprises a substantially rectangular material sheet 50 with an upper portion 52 contoured in a general way to accommodate the general form of the breast region of a generic person's upper chest region, and a lower portion 54 contoured in a general way to accommodate the general form of the cavity of a generic person's lower chest region. To conform to the breast region, the upper panel 52 comprises a convex curvature about a horizontal axis, creating a horizontally disposed depression on its back side which accommodates the anatomical protrusion of the breasts. The lower panel 54 comprises a subtle concave curvature about a horizontal axis, creating a horizontally disposed swell on its back side which recesses into the chest cavity. By shaping the sheet 50 in this manner, the contact area between panel and body is more uniformly distributed than say with a flat panel or flat faced box. Accordingly, the load of the storage assembly 22 is distributed throughout the entire chest region providing comfort and stability. To eliminate any irritation due to sharp corners, rounds 56 are provided at each corner of the sheet 50.

Proximate the juncture of the upper 52 and lower panels 54, two parallel, vertically aligned hinge tabs 58a, b extend forward from, and substantially normal to, the sheet 50. The spacing between tabs is configured to accept the width of the storage assembly 22, with one hinge tab 58b extending proximate the right edge of the sheet 50, and the other 58a extending proximate the left edge of the sheet. These hinge tabs may be chamfered and rounded to remove any sharp corners, and each possesses a circular aperture 60a, b axially aligned with the aperture in the opposite tab. These apertures 60a, b are sized and aligned in conjunction with the housing apertures 62a, b to form a set of pivotal joints between the storage assembly 22 and the breast panel 24. A standard fastener 30a, b, such as a rivet or bolt, connects each hinge tab aperture 60a, b to the correspondingly adjacent housing aperture 62a, b and receptacle aperture 64a, b with the fastener serving as the hinge pin. To prevent abrasive wear within the joint, due to repeated stowage and deployment of the storage assembly, spacers 68a, b may be inserted between the hinge tab 58a, b and the outside of the storage assembly 22 wall in each joint. It will be understood that various other pivot structures may be used to interconnect the breast panel and storage assembly, such as, for example, rods, pins and various other fasteners, or hubs or other protrusions molded or formed on one part for engaging a corresponding bore or receptacle on the other.

The breast panel 24, including sheet 50 and hinge tabs 58a, b, may preferably be formed from a semi-rigid material, such as plastic, which is approximately ⅛ inch thick. By using a semi-rigid sheet material, the breast panel 24 may yielding deflect and conform as the wearer articulates his body. Alternatively, the added comfort afforded by a compliant panel may be sacrificed by using a more rigid panel structure made from material which is thicker or has a higher modulus such as aluminum or fiber reinforced plastic.

For the sake of economical production, the breast panel 24 may preferably be formed as a single integral part. This may be accomplished by a molding process such as injection molding, or by thermo-forming, in which a flat stamped sheet may be heated against a contoured die to form the ergonomic profile on the sheet 50 and fold the hinge tabs 58a, b into the appropriate extended position.

Referring now to FIG. 1 as well as FIG. 4, a set of horizontally disposed through slots 70a, b may adjoin the upper corners of the breast panel 24, allowing the upper terminus 72a, b of each shoulder strap 28a, b to be fed through and secured to itself by sewing, rivets or other means. A set of vertically disposed through slots 74a, b may adjoin the lower corners of the breast panel 24, allowing the lower terminus 76a, b of each shoulder strap 28a, b to be fed through and secured to itself by similar means. From its upper connection, the left shoulder strap 28a, passes over the wearer's left shoulder, passes under the left arm and rejoins the breast plate 24 at its lower connection as described. From its upper connection, the right shoulder strap 28b, passes over the wearer's right shoulder, passes under the right arm and rejoins the breast plate 24 at its lower connection as described. By orienting the upper slots 70a, b horizontally, the flat faces of the upper shoulder strap ends 72a, b drape over the shoulders without twisting, thus providing maximum bearing contact area and the greatest comfort. The lower slots 74a, b are oriented vertically to achieve this same effect on the wearer's flank as the lower ends of the straps 76a, b wrap around the sides of the upper torso. As the lower end transitions into the upper end of each shoulder strap 28a, b, this flat aspect is maintained with respect to the wearer's anatomical contours, providing comfortable distribution of the tackle box weight. To assure that the shoulder straps 28a, b remain seated on the wearer's shoulders during dynamic activities, a substantially horizontally disposed lateral stabilizing strap 78 may be configured to join the two shoulder straps 28a, b across the wearer's upper back. This lateral strap 78 may connect to the shoulder straps 28a, b by sewing, rivets, or other means.

The shoulder straps 28a, b and lateral strap 78 may be formed from any suitable, flexible strap material such as 1 inch nylon or polypropylene webbing. For added comfort, the webbing width may be increased, or padding may be added as is typical on backpacks and soft luggage. An adjustable quick release buckle 80a, b, such as a plastic Fastec® side release buckle, may be incorporated into each shoulder strap 28a, b proximate its lower breast panel connection. These quick release buckles 80a, b may be connected in the conventional manner, providing shoulder strap length adjustment for optimal fit, and an intermediate disconnect on the straps to aid in donning or removing the tackle box 20.

Centered between the upper slots 70a, b of the breast plate 24, is a third horizontally disposed through slot 82 which adjoins the upper edge of the breast panel. This slot 82 may be used to secure an elastic retaining strap 84 which serves as one component of the two part latch assembly 32. The second component is an angulated prong 86 mounted on the outer front end wall 88 of the housing 90. The retaining strap 84 may comprise an elastically yielding material such as rubber, elastic webbing, or a bungy cord, for example. In the preferred embodiment, a rubber strap 84 comprising a latch hole 92 and a securement loop 94 is employed. The retaining strap 84 may be secured to the breast panel 24 by passing its free end 96 through the slot 82 and then looping it back on itself such that the free end 96 passes through the securement loop 88. The storage assembly 22 may then be secured in its upright stowed position by stretching the retaining strap 84 and hooking the latch hole 92 onto the latch prong 86.

c. Housing

Figure 5:
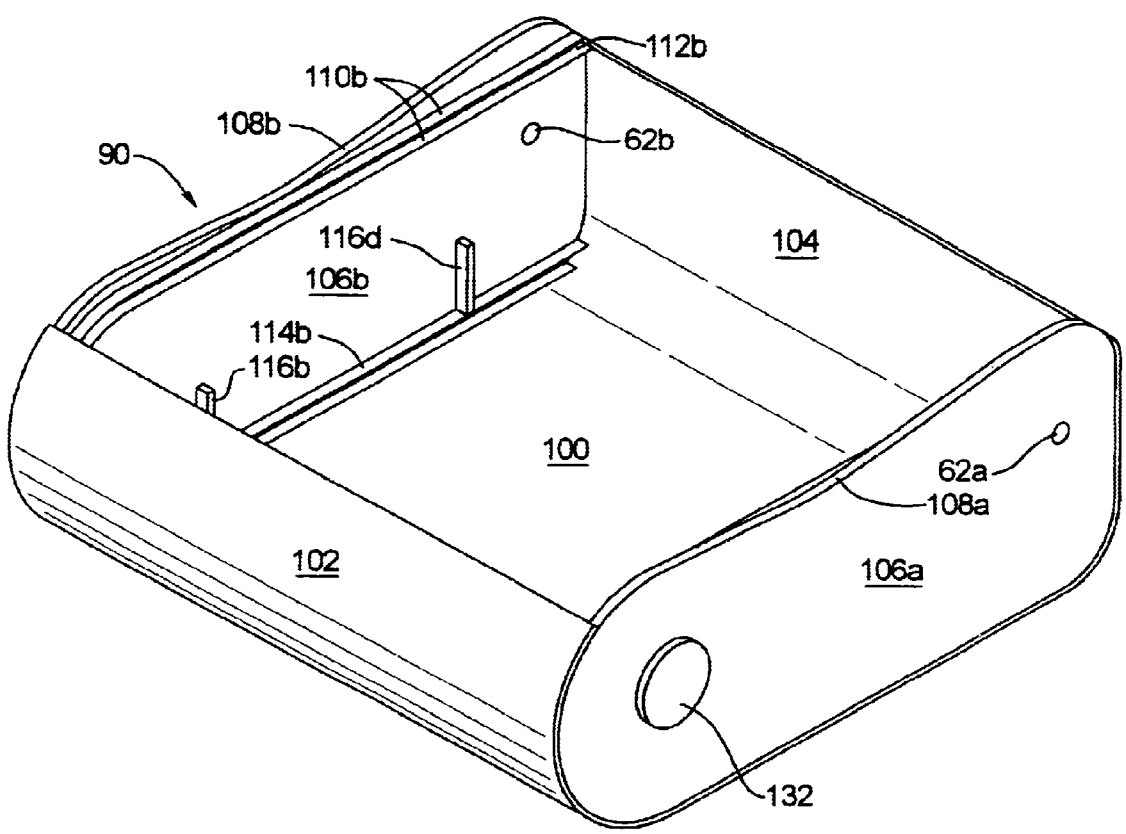
FIG. 5 is an isometric view of the housing of the portable tackle box of FIG. 1.

Referring to FIG. 4 and FIG. 5, in the preferred embodiment, the housing 90 is a four sided, open topped box which forms the outer shell body of the storage assembly 22. The housing 90 comprises a substantially flat and rectangular floor 100 that contours seamlessly into an arcuate front wall 102 and rounds into a substantially vertically disposed, flat rear wall 104. The side walls 106a, b comprise flat, vertically disposed plates with front, rear, and bottom edge profiles that conform to join to the respective front wall, rear wall, and floor of the housing. The top edge 108a, b of each side wall 106a, b is contoured to conform with the ergonomic profile of the breast panel 24, such that when the housing 90 is pivoted upward into a stowed position, the unit nests snugly against the breast panel, thus drawing the housing's center of gravity closer to the wearer's body and minimizing instability.

In the stowed position, the curved front wall 102 is disposed upwardly so that rainwater is shed forwardly and rearwardly by the curved surface without accumulating and seeping into the assembly. Water shed towards the rear simply flows down over the closed tambour door, so that the assembly is essentially waterproof in the stowed position.

A circular aperture 62a, b is formed in each side wall 106a, b proximate the rear wall 104 of the housing 90. As discussed previously, these apertures 62a, b are configured in conjunction with the apertures 60a, b on the breast panel hinge tabs 58a, b to provide a pivotal joint for the stowage and deployment of the storage assembly 22.

On the inside face of each side wall 106a, b, a continuous, parallel set of raised ribs 110a, b (110a not shown) extend adjacent each wall's top, front, and bottom edges, forming a track 112,a, b (112a not shown) for the sliding retention of the tamboured lid 34. The height of the rear wall 104 terminates below the height of the track 112a, b adjoining the top edge 108a, b of the side walls 106a, b, so that the tamboured lid 34 can be inserted into the slot during assembly. It will be understood that in some embodiments the tambour track may be formed by grooves in the side walls rather than by raised ribs.

The relief height of the sidewall rib pairs 110a, b adjoining the floor 100 of the housing 90 is extended in relation to the remaining rib portions, forming a lower rib extension platform 114a, b. During assembly, the lower edges of the receptacle sidewalls 116a, b seat on these extension platforms 114a, b, elevating the receptacle 38 above the housing floor 100 and providing an internal cavity, between the receptacle 38 and housing floor 100, for the sliding insertion of the tamboured lid 34 when retracted during opening.

On the inside face of each side wall 106a, b, a set of parallel alignment ribs 116a–d (116a, c not shown) extends substantially vertically from the rib extension platforms 114a, b. These alignment ribs 116a–d are configured to mate with a corresponding set of shallow grooved slots 118a, d (118b, d not shown) on the outer surface of the receptacle sidewalls 116a, b, providing alignment means for assembly of the receptacle 38 within the housing 90.

To deploy the storage assembly, the housing 90 is pivoted downwardly until the lower portion of its rear wall 104 contacts the breast plate 24. To provide a more positive action and to reduce the effect of wear and marring due to repeated stowage and deployment of the unit, a pivot stop such as a set of rectangular protruding stop feet 120a, b, may be added to the housing's rear wall 104 proximate this contact region. These stop feet 120a, b can be viewed in FIG. 1.

When the housing is in the deployed position the forward wall 102 of the housing is disposed distally, away from the wearer's body. In this position the convexly curved surface of the forward wall serves to eliminate any sharp corners that might graze against the user's forearms or catch on tackle during use.

The housing 90 is optionally provided with one or more hubs or bosses 132 formed or mounted on the outer surfaces of the side walls 106a, b. The hubs are sized and configured to be received through the central opening 134 of a spool 136 containing monofilament leader, tippet or other fishing line. This permits the fishermen to "snap" one or more spools onto the hubs on either side of the assembly, at convenient chest level, and then strip off the line 138 as the spool rotates on the hub 132. Other forms of attachments may be provided for the spools, in addition to or in place of the hubs 132 that are shown, such as, for example, various fixed or folding studs or shafts, with or without end keepers and configured to be received in the central openings of the spools.

In the preferred embodiment, the housing 90 is molded from plastic as a single integral unit, including stop feet 120a, b and latch prong 86. By use of this material and production means, a tough, light weight unit can be produced at low cost. Alternatively, the housing may be made from individually molded plastic components and assembled by adhesives, thermoforming, or other conventional methods. In addition, other materials such as aluminum or other could be used.

d. Receptacle

Referring to FIG. 4, the receptacle 38 provides compartmentalized storage area for tackle or other items. In the preferred embodiment, the receptacle 38 comprises an open topped box structure, configured to nest within the housing 90 and formed from an assemblage of flat rectangular panels including a floor (not shown), two side walls 116a, b, a front wall 122 and a rear wall 124. This assemblage may be made out of metal sheet or other suitable material, however the preferred construction is integrally molded plastic due to its low-cost efficiency.

In the illustrated embodiment, the interior cavity of the receptacle 38 is divided into one or more storage bins 36 by placing a partitioning element 40 within the receptacle's interior. In FIG. 4, a single partitioning element 40 is shown, made up of an integrated lattice of intersecting divider walls 126 joined to the receptacle's exterior walls; in this manner, the partitioning element may be integrally molded with the receptacle walls and floor, or fabricated from metal sheet or other material and joined by conventional means. As an alternative, however, the partitioning element 40 may comprise a removable and configurable, modular arrangement of individual dividers, or bins or boxes made, for example, from plastic or metal. In addition, many tackle box manufacturers have their own designs and sets of configurable bin inserts and trays, and the receptacle 38 of the present invention may be configured to accept these modular units using existing installation methods. Still further, the bins or receptacles may be arranged in multiple layers, such as two layers of thin boxes for dry flies, with the boxes in the upper layer being removable so as to provide access to the article in the lower layer of boxes.

In addition, one or more of the storage bins may optionally be provided with a magnet or magnets for retaining hooks, swivels or other ferrous tackle articles therein. For example, a magnet may be adhered or otherwise mounted to the bottom of the storage bin, or a washer or other generally flat, ferrous member may be mounted in the bottom of each of the bins so as to enable the user to move the magnet or magnets from the bottom of one bin to another as desired. Small, generally flat rare-earth magnets are eminently suitable for this purpose.

As discussed previously, each side wall includes a set of vertically slotted grooves 118a–d which extend from the lower edge of its outer face. To assemble the receptacle 38 to the housing 90, the receptacle is vertically inserted into the housing cavity such that these grooves slidingly mate with the alignment ribs 116a–d. The lower rib extension platforms 114a, b on the housing side walls 106a, b define the extent of insertion, and the receptacle is then secured by assembling the pivot joint such that the pivot joint fastener 30a, b connects the receptacle and housing via their common apertures.

The height of the receptacle's front wall 122, side walls 116a, b, and partition walls 126 are configured to extend to the bottom of the tambour lid track 112,a, b adjoining the upper edge 108a, b of each housing side wall 106a, b. In this manner, the tamboured lid 34 will securely seal the receptacle 38 and prevent spillage or shuffling of its contents when closed. The height of the rear wall 124, slightly exceeds the others (e.g., by about ⅛ inch) such that it blocks the end of the tambour lid track 112,a, b, thus preventing the lid 34 from sliding out the end of the track when the storage assembly 22 is rotated into its vertically stowed orientation.

e. Tamboured Lid

By way of background, a tamboured panel in the traditional sense would consist of stiff, narrow wood strips adhered or mechanically fastened to a flexible backing material. Such a panel is flexurally rigid about an axis perpendicular to the strips, but, since the panel can bend between the strips, is flexurally compliant about an axis parallel with the strips. This same principle is utilized for the tamboured lid 34 in the present invention. Although the tamboured lid construction could be implemented using a variety of materials and assembly methods, in the preferred embodiment of FIG. 4, the lid 34 is constructed from a single sheet of molded plastic comprising a linear array of alternating ribs 130 and grooves 132. Such a material is commonly used in the automotive industry to fabricate interior consoles and storage bins, and is available in sheets that may simply be cut to size.

The grooves 132 provide the flexural compliance which allows the lid 34 to bend as it transitions from the top to the bottom of the housing 90 while being opened or closed. The groove depth may be configured accordingly. The thickness of the ribs 130 is configured to allow sliding reciprocation within the tambour lid track 112,a, b and the width of the lid 34 is configured to assure it does not jump the track. Proximate its free, exterior edge, a slide handle 134 made from plastic, or other suitable material, may be integrally molded or connected to the lid 34 by mechanical fasteners or other means.

It is to be recognized that various alterations, modifications, and/or additions may be introduced into the constructions and arrangements of parts described above without departing from the spirit or ambit of the present invention as defined by the appended claims.

What is claimed is:

1. A chest-worn tackle box assembly, comprising:
   a breast plate for engaging a front of a person's chest, said breast plate comprising a thin panel member having an upper portion that is forwardly, convexly curved about a horizontal axis for ergonomically engaging a convexly curved upper portion of a person's chest;
   a harness mounted to said breast plate for supporting said breast plate from a person's shoulders;
   a tackle storage box having at least one interior compartment and an access opening in a top thereof;
   a sliding tambour door mounted to said tackle storage box so as to selectively cover said access opening; and
   means for pivotally mounting a rearward portion of said tackle storage box to a lower portion of said breast plate so that when said breast plate is supported from a person's shoulders said tackle storage box is selectively pivotable from a vertical stowed position, in which said top of said storage box engages said breastplate, to a horizontal deployed position, in which said top of said storage box is disposed upwardly and said interior compartment is accessible by sliding said tambour door from over said access opening.

2. The tackle box assembly of claim 1, wherein said storage box comprises:
   first and second generally parallel side walls having tracks that support first and second edges of said tambour door for sliding motion therein.

3. The tackle box assembly of claim 2, wherein said first and second side walls of said storage box extend substantially perpendicular to said breast plate, so that access opening is selectively covered and uncovered by sliding said tambour door in first and second directions perpendicular to said breast plate.

4. The tackle box assembly of claim 3, wherein said tracks on said first and second side walls each comprise:
   an upper run that extends forwardly along upper edges of said side walls, a forward run that extends downwardly along forward edges of said side walls, and a lower run that extends rearwardly along lower edges of said side walls, so that said access opening is uncovered by sliding said tambour door in an outward direction away from said breastplate.

5. The tackle box assembly of claim 4, wherein said storage box comprises:
bottom, forward and rearward walls enclosing said interior compartment.

6. The tackle box assembly of claim 5, wherein said interior compartment comprises:
a floor panel that forms a bottom of said interior compartment, said floor panel being mounted above said lower run of said tracks so as to form an open space for receiving said tambour door when said tambour door is slid into said lower run of said tracks.

7. The tackle box assembly of claim 6, wherein said interior compartment comprises:
at least one divider wall that divides said compartment into a plurality of sub-compartments for segregated storage of tackle items therein.

8. The tackle box assembly of claim 3, wherein said first and second side walls of said storage box each comprise:
a generally concavely generally concavely curved about a generally horizontal axis for engaging said convexly curved upper portion of said panel member in substantial conformity therewith when said storage box is in said stowed position.

9. The tackle box assembly of claim 3, wherein said panel member comprises:
first and second generally horizontal slots in an upper portion thereof that receive first and second shoulder straps of said harness so that said shoulder straps are oriented to lie substantially flat against a person's chest and shoulder when worn; and
first and second generally vertical slots in a lower portion thereof that receive first and second waist straps of said harness so that said waist straps are oriented to lie substantially flat against sides of a person's torso when worn.

10. The tackle box assembly of claim 3, wherein said panel member comprises a generally rectangular panel having first and second generally vertically extending side edges, and wherein said means for pivotably mounting said storage box to said breast plate comprises:
first and second ear portions projecting forwardly from said panel member proximate said side edges thereof and generally parallel to said first and second side walls of said storage box; and
at least on pivot shaft extending generally parallel to said panel member and pivotably interconnecting said ear portions of said panel member and said side walls of said storage box.

11. The tackle box assembly of claim 10, wherein said panel member further comprises:
an extension portion extending downwardly below said ear portions for distributing a weight of said storage box against a lower portion of a person's chest when said storage box is in said deployed position.

12. The tackle box assembly of claim 11, wherein said storage box further comprises:
at least one stop member that projects rearwardly from said storage box for engaging said extension portion of said panel member so as to hold said storage box firmly in a horizontal orientation when in said deployed position.

13. The tackle box assembly of claim 10, further comprising:

means for releasably retaining said storage box in said stowed position.

14. The tackle box assembly of claim 13, wherein said means for retaining said storage box in said stowed position comprises:
a strap member having a first end that is mounted to an upper portion of said panel member and a second end that extends forwardly therefrom; and
means for detachably mounting said second end of said strap member to said storage box proximate a forward end thereof.

15. The tackle box assembly of claim 14, wherein said strap member is formed of elastomeric material so that said strap member resiliently urges said top of said storage box into engagement with said forward surface of said panel member when said storage box is in said stowed position.

16. The tackle box assembly of claim 3, further comprising:
at least one boss portion extending laterally outwardly from at least one of said side walls for detachably receiving a spool of fishing line in rotating engagement therewith.

17. The tackle box assembly of claim 1, wherein said panel member of said breast plate further comprises:
a lower portion that is generally rearwardly, concavely curved about a generally horizontal axis for ergonomically engaging a lower portion of a person's chest.

18. A chest-worn tackle box assembly, comprising:
a breast plate for engaging a front of a person's chest, said breast plate comprising a thin panel member having an upper portion that is forwardly, convexly curved about a horizontal axis for ergonomically engaging a convexly curved upper portion of a person's chest;
a harness mounted to said breast plate for supporting said breast plate from a person's shoulders;
a tackle storage box having at least one interior compartment and an access opening in a top thereof, said storage box comprising:
first and second generally parallel side walls having tracks that support first and second edges of said tambour door for sliding motion therein, said first and second side walls of said storage box extending substantially perpendicular to said breast plate so that access opening is selectively covered and uncovered by sliding said tambour door in first and second directions perpendicular to said breast plate;
at least one boss portion extending laterally outwardly from at least one of said side walls for detachably receiving a spool of fishing line in rotating engagement therewith;
a sliding tambour mounted to said storage box so as to selectively cover said access opening; and
means for pivotally mounting a rearward portion of said tackle storage box to a lower portion of said breast plate so that when said breast plate is supported from a person's shoulders said tackle storage box is selectively pivotable from a vertical stowed position, in which said top of said storage box engages said breastplate, to a horizontal deployed position, in which said top of said storage box is disposed upwardly and said interior compartment is accessible by sliding said tambour door from over said access opening.

19. A chest-worn tackle box assembly, comprising:
a breast plate for engaging a front of a person's chest;
a harness mounted to said breast plate for supporting said breast plate from a person's shoulders;

a tackle storage box having an access opening in a top thereof and at least one interior compartment, said tackle box comprising:

first and second parallel side walls extending substantially perpendicular to said breast plate;

a sliding tambour door mounted to said side walls so as to selectively cover said access opening;

tracks on said first and second side walls that support first and second edges of said tambour door for sliding motion therein, said tracks comprising upper runs that extend forwardly along upper edges of said side walls, forward runs that extend downwardly along forward edges of said side walls, and lower runs that extend rearwardly along lower edges of said side walls;

a floor panel that forms a bottom of said interior compartment, said floor panel spanning said side walls at a position above said lower runs of said tracks;

an outer wall mounted to said lower edges of said side walls at a position below said lower runs of said tracks, so that a spaced gap is formed with said floor wall for passage of said tambour door therein; and a front wall mounted to said outer wall and said forward ends of said side walls at a position forward of said forward runs of said tracks, said front wall extending over a forward end of said storage box so as to exclude rainwater from entering said gap between said floor and outer walls when said storage box is stowed in a vertical orientation; and means for pivotally mounting a rearward portion of said tackle storage box to a lower portion of said breast plate so that when said breast plate is supported from a person's shoulders said tackle storage box is selectively pivotable from a vertical stowed position, in which said top of said storage box engages said breastplate, to a horizontal deployed position, in which said top said tackle storage box is selectively pivotable from a vertical stowed position, in which said top of said storage box engages said breastplate, to a horizontal deployed position, in which said top of said storage box is disposed upwardly and said interior compartment is accessible by sliding said tambour door from over said access opening.

20. The tackle box assembly of claim 19, wherein said front wall of said storage box is outwardly and generally convexly curved so that rainwater is shed forwardly and rearwardly therefrom when said storage box is in said stowed position with said front wall disposed upwardly.

21. The tackle box assembly of claim 20, wherein said front wall of said storage box comprises:

a rearwardly curving upper edge that extends laterally between said first and second side walls so as to form a forward edge of said access opening in said top of said storage box.

22. The tackle box assembly of claim 21, further comprising:

a handle mounted to a rearward edge of said tambour door and extending upwardly therefrom for manually sliding said door from over said access opening, and for engaging said edge of said front wall so as to form a stop that limits travel of said door into said tracks.

23. The tackle box of claim 21, wherein said breast plate comprises:

a thin panel member having an upper portion that is generally forwardly, convexly curved about a generally horizontal axis for ergonomically engaging an upper portion of a person's chest.

24. The tackle box assembly of claim 23, wherein said panel member further includes a lower portion that is generally rearwardly, concavely curved about a generally horizontal axis for ergonomically engaging a lower portion of a person's chest.

25. The tackle box assembly of claim 24, wherein said upper runs of said tracks are substantially straight and said upper edges of said side walls extend beyond said upper runs of said tracks and are curved to follow said convexly and concavely curved portions of said breast plate so that said upper edges of said side walls conform to and engage said breast plate when said storage box is in said vertical, stowed position.

26. The tackle box assembly of claim 19, further comprising:

a boss portion extending outwardly from at least one of said side walls of said storage box for detachably receiving a spool of fishing line in rotating engagement therewith.

27. The tackle box assembly of claim 26, wherein said boss portion is located proximate said forward edge of said side wall so as to be positioned a spaced distance forwardly of said breast plate for ease of access when said storage box is in said horizontal, deployed position.

* * * * *